United States Patent
Tada et al.

(10) Patent No.: US 6,826,567 B2
(45) Date of Patent: Nov. 30, 2004

(54) REGISTRATION METHOD AND SEARCH METHOD FOR STRUCTURED DOCUMENTS

(75) Inventors: Katsumi Tada, Kawasaki (JP);
Natsuko Sugaya, Kawasaki (JP);
Tadataka Matsubayashi, Osaka (JP);
Takuya Okamoto, Sagamihara (JP);
Yasushi Kawashimo, Hirakata (JP)

(73) Assignee: Hitachi, Ltd., Tokyo (JP)

( * ) Notice: Subject to any disclaimer, the term of this patent is extended or adjusted under 35 U.S.C. 154(b) by 114 days.

(21) Appl. No.: 10/218,495

(22) Filed: Aug. 15, 2002

(65) Prior Publication Data

US 2002/0188604 A1 Dec. 12, 2002

Related U.S. Application Data

(63) Continuation of application No. 09/300,594, filed on Apr. 28, 1999, now Pat. No. 6,496,820.

(51) Int. Cl.[7] .............................................. G06F 17/30
(52) U.S. Cl. ....................... 707/5; 707/2; 707/3; 707/1; 704/10; 715/517; 715/532
(58) Field of Search .................... 707/1–10, 100–104.1; 704/1, 10, 9; 382/225, 305; 715/517, 501, 516, 513, 532

(56) References Cited

U.S. PATENT DOCUMENTS

| | | | |
|---|---|---|---|
| 5,276,616 A | * 1/1994 | Kuga et al. ................... 704/10 |
| 5,465,353 A | 11/1995 | Hull | |
| 5,669,007 A | 9/1997 | Tateishi | |
| 5,704,060 A | 12/1997 | Del Monte | |
| 5,745,745 A | * 4/1998 | Tada et al. ...................... 707/1 |
| 5,748,953 A | 5/1998 | Mizutani et al. | |
| 5,757,983 A | 5/1998 | Kawaguchi et al. | |
| 5,848,407 A | * 12/1998 | Ishikawa et al. ............... 707/2 |
| 5,943,443 A | 8/1999 | Itonori et al. | |
| 5,943,669 A | * 8/1999 | Numata ........................... 707/5 |
| 5,983,171 A | 11/1999 | Yokoyama et al. | |
| 5,991,713 A | * 11/1999 | Unger et al. .................... 704/9 |
| 6,377,946 B1 | * 4/2002 | Okamoto et al. .............. 707/5 |
| 6,496,820 B1 | * 12/2002 | Tada et al. ...................... 707/5 |

OTHER PUBLICATIONS

"Information Retrieval Prentice Hall", pp. 373–374 and pp. 219–227.

* cited by examiner

*Primary Examiner*—Jean M. Corrielus
*Assistant Examiner*—Anh Ly
(74) *Attorney, Agent, or Firm*—Antonelli, Terry, Stout & Kraus, LLP

(57) ABSTRACT

A registration/search method for structured documents where correspondence data is prepared between a fixed-length-string and a string occurrence position within a structured document for all fixed-length-strings in the document and for each structured document. A list of a character and all hierarchical elements containing the character and element lengths is prepared. An occurrence frequency and an occurrence position of a search term is obtained using the plurality of fixed-length-substrings and the occurrence frequency extracting index. A search character is selected from the search term. A hierarchical element containing the search character is obtained using the character from the element length index. A length of the element corresponding to a search range is extracted using the obtained occurrence position. A matching degree for the search term is calculated from the obtained occurrence frequency of the search term and the extracted element length of the element corresponding to the search range.

10 Claims, 12 Drawing Sheets

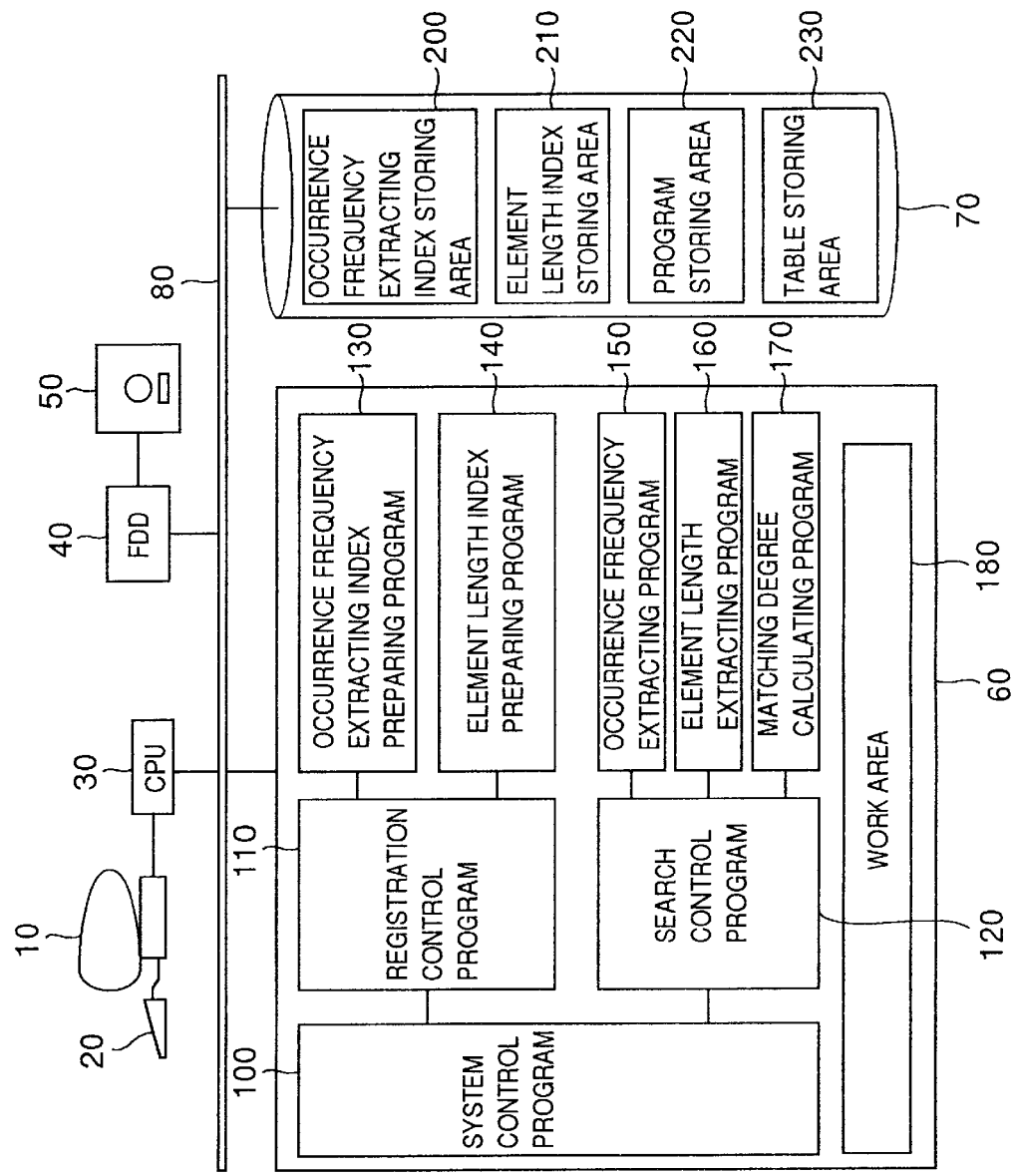

FIG.2

```
< !DOCTYPE THESIS SYSTEM "ronbun . dtd" >
< THESIS >
< TITLE > SGMLにおける文書変換言語の開発とその適用事例 < /TITLE >
< AUTHOR >
< NAME > 神奈川一郎 < /NAME >
< NAME > 横浜二郎 < /NAME >
< NAME > 川崎三郎 < /NAME >
< /AUTHOR >
< DATE > 1996年10月23日 < /DATE >
< TEXT >
< CHAPTER >
< CHAPTER SUBJECT > はじめに < /CHAPTER SUBJECT >
< PARAGRAPH > 文書記述にSGMLを用いることによって… < /PARAGRAPH >
< PARAGRAPH > 作成したSGML文書をさまざまな… < /PARAGRAPH >
< /CLAUSE >
< CLAUSE >
< CLAUSE SUBJECT > 適用事例 < /CLAUSE SUBJECT >
< TERM >
< TERM SUBJECT > 背景 < /TERM SUBJECT >
< PARAGRAPH > 現在、ISOでは… < /PARAGRAPH >
< /CLAUSE >
< CLAUSE >
< CLAUSE SUBJECT > 変換処理の実例 < /CLAUSE SUBJECT >
< TERM >
< TERM SUBJECT > 数式の変換 < /TERM SUBJECT >
< PARAGRAPH > JIS規格DTDでは、基本的に数式を… < /PARAGRAPH >
< REMARK : TYPE = NOTE> ただし、行列式の場合には < /REMARK >
< /TERM >
< /CLAUSE >
< /CHAPTER >
< /TEXT >
< REFERENCE LIST >
< REFERENCE >
< TITLE > SGMLインスタンスの変換方式の検討 < /TITLE >
< AUTHOR >
< NAME > 今郷詔 < /NAME >
< /AUTHOR >
< /REFERENCE >
< /REFERENCE LIST >
< /THESIS >
```

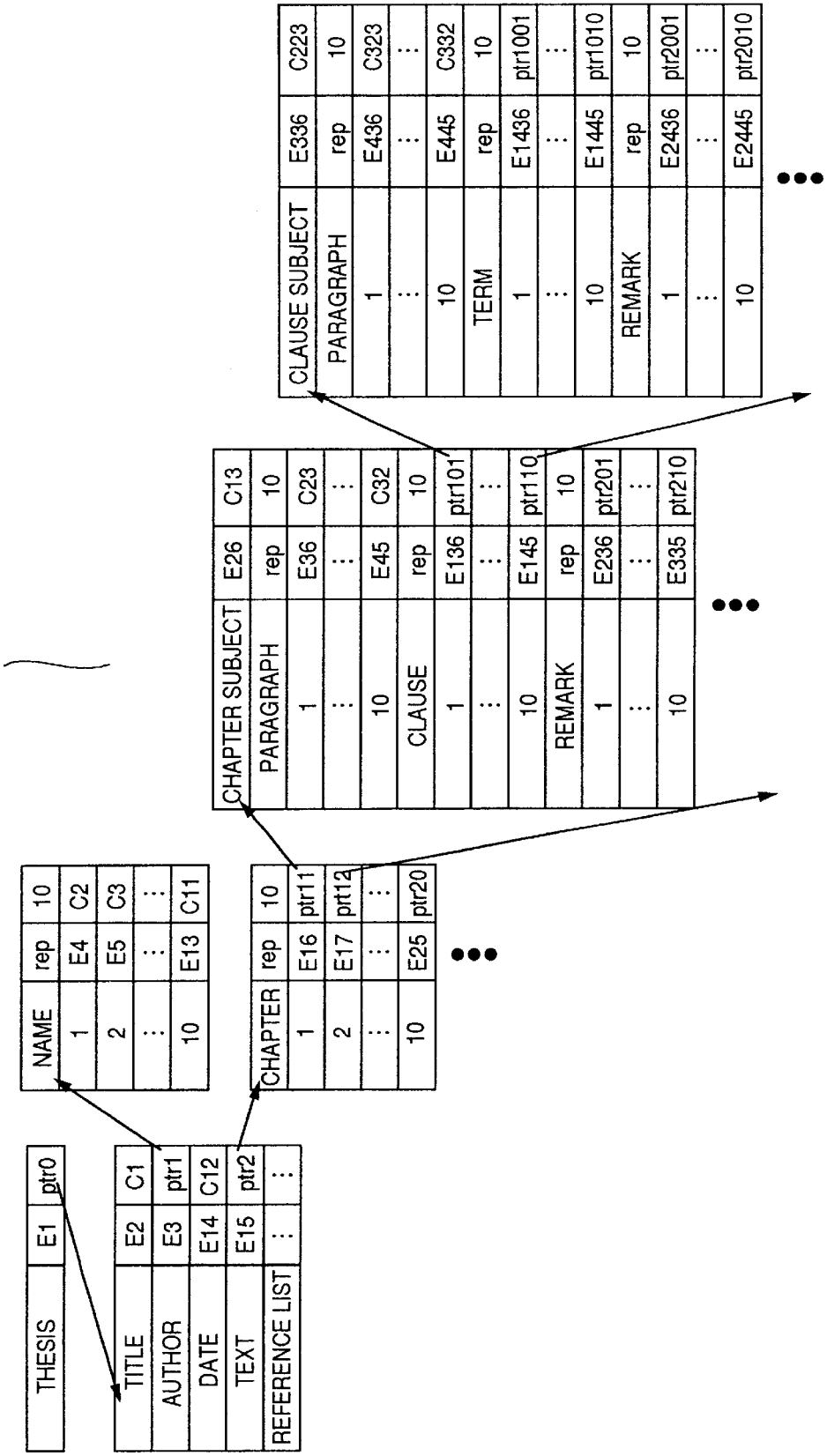

FIG.5

STRUCTURED FULL-TEXT DATA

| DOCUMENT ID | CONTEXT ID | | CONTENT |
|---|---|---|---|
| D1 | C1 | (TITLE) | "SGML文書変換言語の開発とその適用事例" |
| | C2 | (NAME 1) | "神奈川一郎" |
| | C3 | (NAME 2) | "横浜二郎" |
| | C4 | (NAME 3) | "川崎三郎" |
| | C12 | (DATE) | "1996年10月23日" |
| | C13 | (CHAPTER 1 - CHAPTER SUBJECT) | "はじめに…" |
| | C23 | (CHAPTER 1 - PARAGRAPH 1) | "文書記述言語にSGMLを用いることによって…" |
| | C24 | (CHAPTER 1 - PARAGRAPH 2) | "作成したSGML文書をさまざな…" |
| | C14 | (CHAPTER 2 - CHAPTER SUBJECT) | "適用事例" |
| | C233 | (CHAPTER 2 - CLAUSE 1 - CLAUSE SUBJECT) | "背景" |
| | C423 | (CHAPTER 2 - CLAUSE 1 - PARAGRAPH 1) | "現在、ISOでは…" |
| | C15 | (CHAPTER 3 - CHAPTER SUBJECT) | "変換処理の実例" |
| | C243 | (CHAPTER 3 - CLAUSE 1 - CLAUSE SUBJECT) | "数式の変換" |

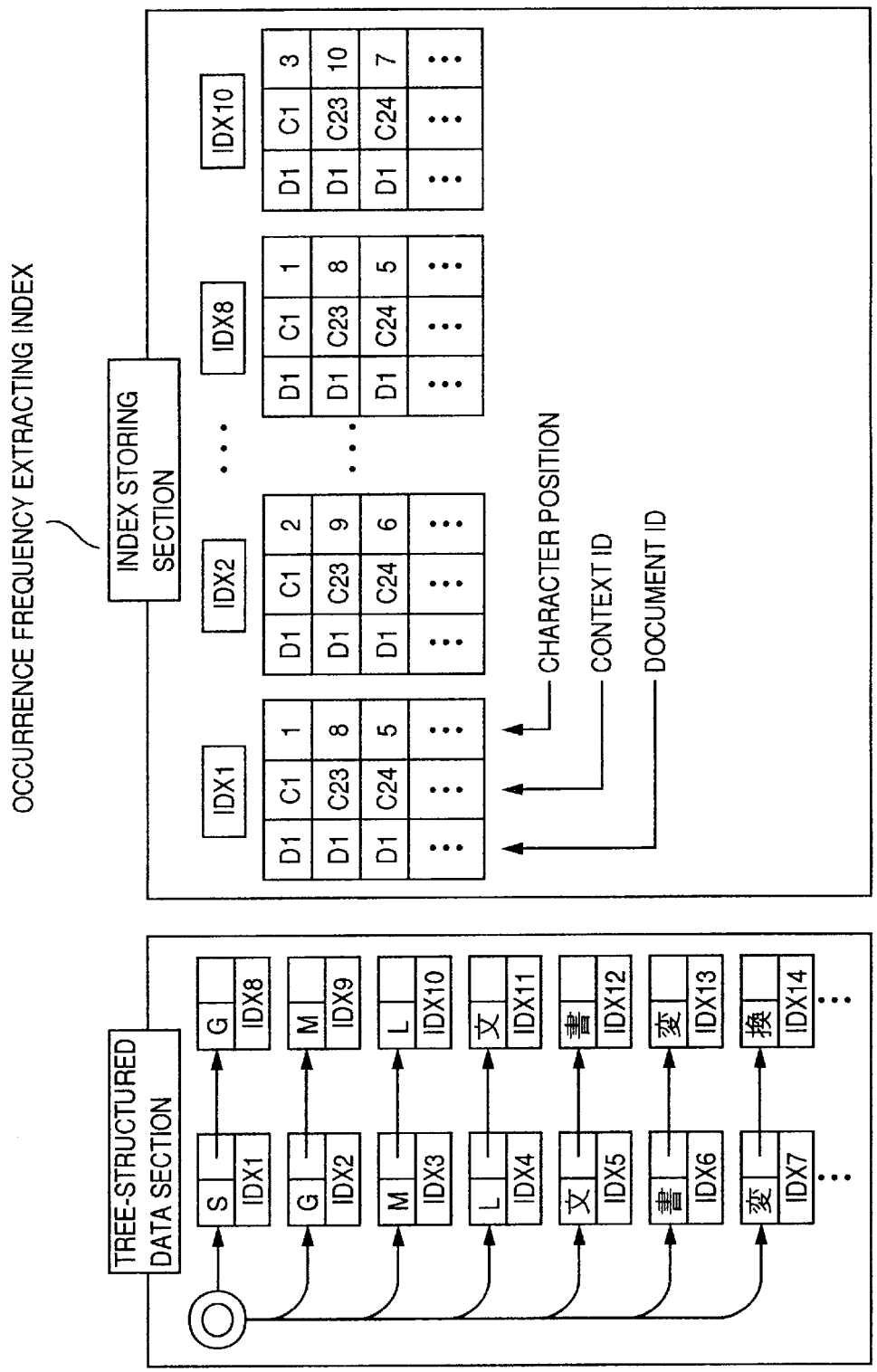

FIG.8

PER-ELEMENT CHARACTER COMPONENT TABLE

| ELEMENT ID | 'a' | ... | 'G' | ... | 'L' | 'M' | ... | 'S' | ... | '文' | ... |
|---|---|---|---|---|---|---|---|---|---|---|---|
| E1 | 0 | ... | 1 | ... | 1 | 1 | ... | 1 | ... | 1 | ... |
| E2 | 0 | ... | 1 | ... | 1 | 1 | ... | 1 | ... | 1 | ... |
| E3 | 0 | ... | 0 | ... | 0 | 0 | ... | 0 | ... | 0 | ... |
| E4 | 0 | ... | 0 | ... | 0 | 0 | ... | 0 | ... | 0 | ... |
| E5 | 0 | ... | 0 | ... | 0 | 0 | ... | 0 | ... | 0 | ... |
| E6 | 0 | ... | 0 | ... | 0 | 0 | ... | 0 | ... | 0 | ... |
| E7 | 0 | ... | 0 | ... | 0 | 0 | ... | 0 | ... | 0 | ... |
| E8 | 0 | ... | 1 | ... | 1 | 1 | ... | 1 | ... | 1 | ... |
| E9 | 0 | ... | 1 | ... | 1 | 1 | ... | 1 | ... | 1 | ... |
| E10 | 0 | ... | 0 | ... | 0 | 0 | ... | 0 | ... | 0 | ... |
| E11 | 0 | ... | 1 | ... | 1 | 1 | ... | 1 | ... | 1 | ... |
| E12 | 0 | ... | 1 | ... | 1 | 1 | ... | 1 | ... | 0 | ... |
| ⋮ | ⋮ | ⋮ | ⋮ | ⋮ | ⋮ | ⋮ | ⋮ | ⋮ | ⋮ | ⋮ | |

ELEMENT LENGTH LIST

| ELEMENT ID | ELEMENT LENGTH |
|---|---|
| E1 | 9,886 |
| E2 | 20 |
| E3 | 13 |
| E4 | 5 |
| E5 | 4 |
| E6 | 4 |
| E7 | 11 |
| E8 | 8,224 |
| E9 | 1,256 |
| E10 | 17 |
| E11 | 228 |
| E12 | 186 |
| ⋮ | ⋮ |

FIG.9

ELEMENT LENGTH INDEX

CHARACTER CODE

| 'a' | ... | 'G' | ... | 'L' | 'M' | ... | 'S' | ... |
|---|---|---|---|---|---|---|---|---|
| ⋮ | ... | ⋮ | | ⋮ | ⋮ | ... | ⋮ | |
| | | D1 | | | D1 | | D1 | |
| | | E1 | | | E1 | | E1 | |
| | | 9,886 | ... | D1 | 9,886 | ... | 9,886 | |
| | | E2 | | E1 | E2 | | E2 | |
| | | 20 | | 9,886 | 20 | | 20 | |
| | | E8 | | E2 | E8 | | E8 | |
| | | 8,224 | | 20 | 8,224 | | 8,224 | |
| | | ⋮ | | E8 | ⋮ | | ⋮ | |
| | | | | 8,224 | | | | |
| | | | | ⋮ | | | | |

REGISTRATION METHOD AND SEARCH METHOD FOR STRUCTURED DOCUMENTS

This is a continuation of parent application Ser. No. 09/300,594, filed Apr. 28, 1999 now U.S. Pat. No. 6,496,820, allowed.

CROSS-REFERENCE TO RELATED APPLICATION

This application relates to U.S. patent application Ser. No. 09/256,178 filed on Feb. 24, 1999, which issued as U.S. Pat. No. 6,377,946 on Apr. 23, 2002. (Priority: Japan Application No. 10-043187), and assigned to the present assignee. The content of that application is incorporated herein by reference.

BACKGROUND OF THE INVENTION

The present invention relates to a registration and a search method for structured documents described in SGML (Standard Generalized Markup Language) or the like. More particularly, the invention is directed to a method of storing and a method of reading the lengths of elements forming a document.

As the information society grows at a rapid pace, an enormous amount of electronic documents are being prepared using word processors and personal computers in recent years. Under such circumstances, there are growing needs for searching documents containing the desired information from mounds of electronic documents. Full-text search is a technical solution to such needs. In the full-text search, the entire texts of documents to be registered is entered into a computer system to create a database at the time of registration, and all the documents containing a string (hereinafter referred to as "search term") specified by the user is searched from the database at the time of search, so that all the desired documents can be searched reliably without requiring the user to specify a key word during the registration.

On the other hand, a scoring function is proposed, in which the matching degree to specified search conditions is evaluated by giving a score to each of the searched documents, and a list of such documents arranged in the order of given scores is displayed.

The book "Information Retrieval" (written by William B. Frakes and Ricardo Baeza-Yates and published by Prentice Hall) introduces a technique in which the matching degree (nfreqij) is calculated for searched documents using such factors as the occurrence frequency of a specified search term (hereinafter referred to as "search term occurrence frequency") in each of the searched documents, the text length of each document and the following equation.

$$n\text{freq}ij=(\log_2(\text{freq}ij+1))/\log_2(\text{length}j) \qquad \text{Equation 1}$$

where "freqij" is the occurrence frequency of a search term i in a document j; and "lengthj" is the text length of a document j.

U.S. Pat. No. 5,745,745 discloses a technique in which structured documents containing a search term are searched quickly by preparing a character component table for structured documents.

The related application cited as a cross-reference discloses a technique for registering a structured document by analyzing the hierarchical structure of the document. The application also discloses a technique in which a string index is extracted from a structured document and registered, and in which, at the time of search, a search term is decomposed into substrings and the character positions obtained from a plurality of character indexes are checked to obtain information about which positions in which documents the search term is located.

SUMMARY OF THE INVENTION

Each structured document has a unique hierarchical structure of its own. On the other hand, to calculate the matching degree, the element length of a partial logical structure (i.e., an element) or a higher-level logical structure of a structured document is necessary.

The object of the present invention is to obtain the occurrence frequency of a search term and the length of an element to be searched in a structured document quickly.

The present invention provides a registration method for structured documents, comprising the steps of: preparing correspondence data between a string and a string occurrence position within a structured document for each structured document, and additionally storing the correspondence data in an occurrence frequency extracting index, preparing a list of a character, an element containing the character and an element length thereof and additionally storing the list in an element length index at the time of registration, and also provides a search method for structured documents, comprising the steps of: inputting search conditions including a search term and an element for specifying a search range, decomposing the search term into a plurality of substrings, obtaining an occurrence frequency and an occurrence position of the search term using the plurality of substrings from the occurrence frequency extracting index, selecting a character from the search term, obtaining an element containing the character using the character from the element length index, and further extracting a length of the element within the search range; calculating a matching degree for the search conditions from the occurrence frequency and the occurrence position of the search term and the length of the element within the search range; and outputting the element containing the search term and the matching degree.

BRIEF DESCRIPTION OF THE DRAWINGS

FIG. 1 is a diagram showing a configuration of an embodiment of the present invention;

FIG. 2 is a diagram showing an exemplary structured document described in SGML;

FIG. 4 is a diagram showing a configuration of an element ID (identifier) management table;

FIG. 5 is a diagram showing an example of structured full-text data;

FIG. 6 is a diagram showing the content of an occurrence frequency extracting index;

FIG. 8 is a diagram showing an exemplary per-element character component table and an exemplary element length list;

FIG. 9 is a diagram showing a configuration of an element length index;

Figure 3:
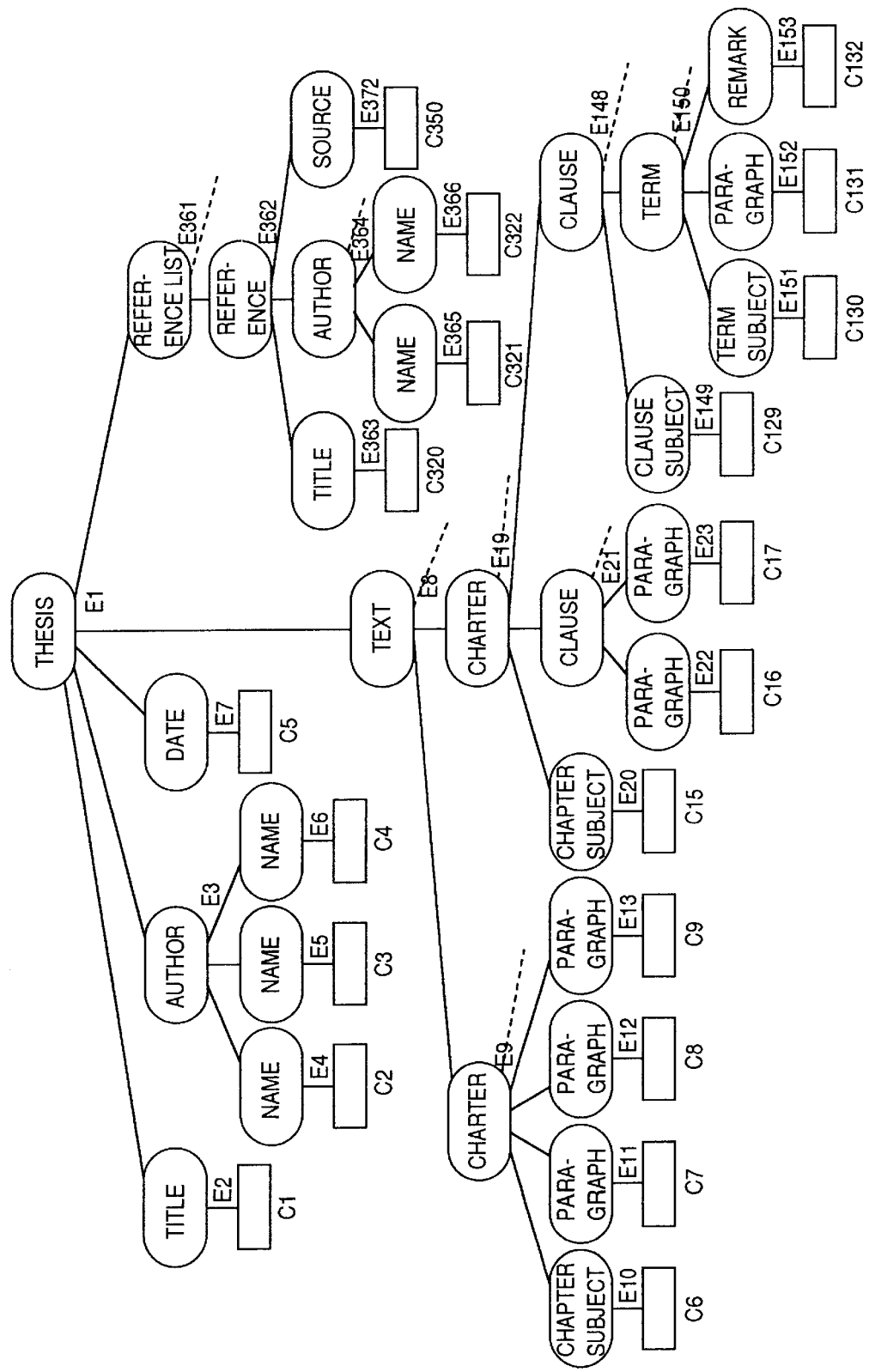
FIG. 3 is a diagram showing logical structures of the structured document shown in FIG. 2.

DETAILED DESCRIPTION OF THE EMBODIMENTS (1) System Configuration

A structured document search system shown in FIG. 1 comprises a display 10 for displaying search results, a keyboard 20 for entering registration and search commands, a central processing unit (CPU) 30 for performing registration and search processing, a floppy disk driver 40 for reading data from a floppy disk, a floppy disk 50 containing structured-document data to be registered into a database, a main memory 60 for temporarily storing registration and search programs and data, a magnetic disk 70 for storing various data and programs and a bus 80 for interconnecting these components.

The main memory 60 reads from the magnetic disk 70 a system control program 100, a registration control program 110, a search control program 120, an occurrence frequency extracting index preparing program 130, an element length index preparing program 140, an occurrence frequency extracting program 150, an element length extracting program 160 and a matching degree calculating program 170. The main memory 60 also provides a work area 180.

Further, the magnetic disk 80 provides an occurrence frequency extracting index storing area 200, an element length index storing area 210, a program storing area 220 and a table storing area 230.

While these storing areas are provided in the magnetic disk 70 in this embodiment, these storing areas may be provided in other a secondary storage unit such as an optical magnetic disk unit.

In this embodiment structured-document data is read from a floppy disk. Instead, the structured-document data may be transmitted to this system via a network by so arranging the system that the system is connected to the network through a network interface. Search and registration commands from the user may also be received via the network.

(2) Registration of Document

The document registration processing of this embodiment will be described.

Figure 10:
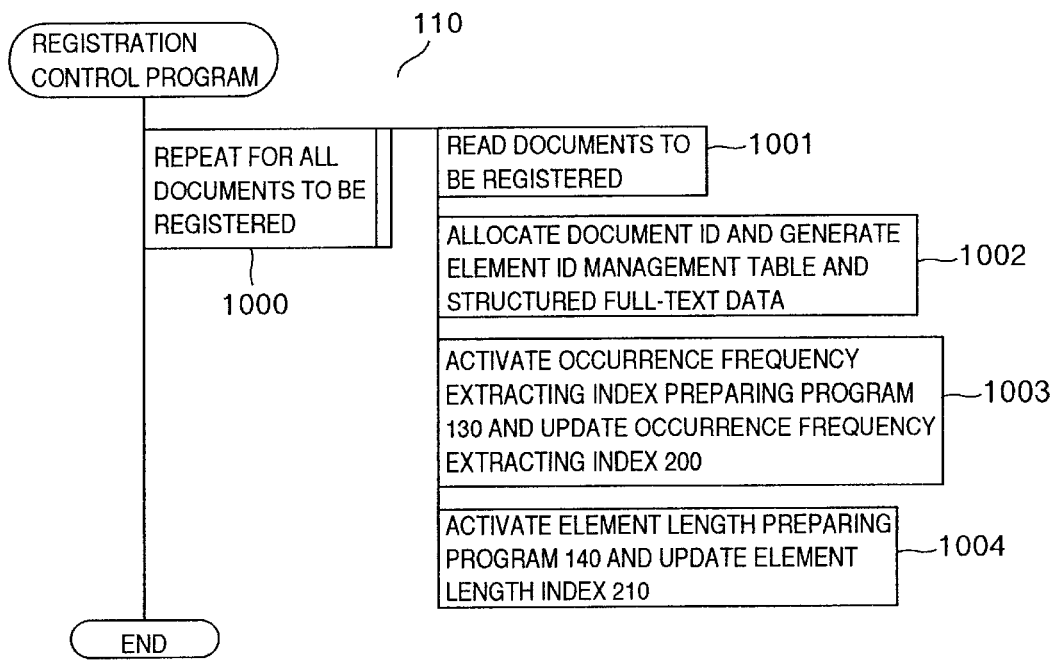
FIG. 10 is a diagram showing processing performed by a registration control program.

When the user enters a registration command for registering a document from the keyboard 20, the system control program 100 activates the registration control program 110 to start document registration processing shown in FIG. 10.

The registration control program 110 performs a series of processing from Steps 1001 to 1004 for all documents to be registered which are stored in the floppy disk 50 or transmitted via a network (Step 1000).

First of all, in Step 1001, a non-processed document is selected from the documents to be registered which are stored in the floppy disk 50 through the floppy disk driver 40, and is read to the work area 180 in the storage memory 60.

The read document has an SGML format such as shown in FIG. 2. In Step 1002, the registration control program 110 gives the read document a document ID (identifier) unique to the system. Further, by analyzing the type definition statements of the logical structures of the document, repetitive logical structures are extracted, and an identifier (element ID) for uniquely identifying any such logical structure within the document and an identifier (context ID) of strings in each element are automatically assigned.

As a result, the document shown in FIG. 2 is represented by a hierarchical structure in which the element IDs and context IDs shown in FIG. 3 are assigned. The hierarchical structure of FIG. 3 is represented by an element ID management table shown in FIG. 4 and structured full-text data shown in FIG. 5, and is located in the work area 180 of the main storage. The document ID and the element ID management table are stored in the area 230 of the magnetic disk 70 while linked with the document name. The structured full-text data is deleted after used in the subsequent processing, but may also be stored in the area 230 of the magnetic disk 70. Methods of preparing the element ID management table and the structured full-text data from a document are described in detail in the related application.

Next, the registration control program 110 activates the occurrence frequency extracting index preparing program 130 to prepare an occurrence frequency extracting index shown in FIG. 6, and stores the prepared index in the storing area 200 in Step 1003. This index is shared by all the documents, and a new index and new data are stored in the storing area 200 while added to the existing indexes and data.

The occurrence frequency extracting index shown in FIG. 6 consists of a tree-structured data section and an index storing section. The tree-structured data section is used to extract the index of a character or a string when the character or the string is entered. Further, the index storing section is a list of documents and positions in the documents in which a character or a string corresponding to an index entered occurs.

Figure 11:
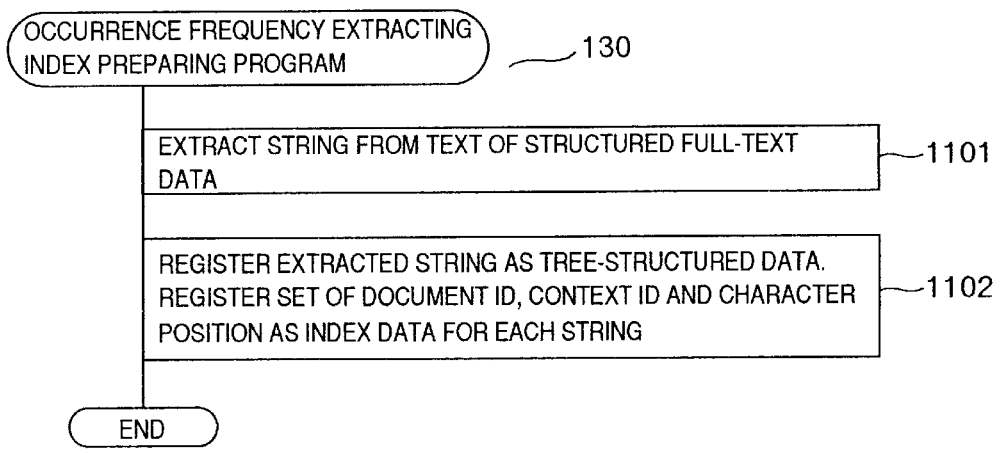
FIG. 11 is a diagram showing processing performed by an occurrence frequency extracting index preparing program.

The processing performed by the occurrence frequency extracting index preparing program 130 is shown in FIG. 11.

In Step 1101, all single character and all strings consisting of two adjacent characters are extracted from a text (content) in the structured full-text data of FIG. 5. For example, "S", "SG", "G", "GM", "M", "ML", "L", "L文","文", "文書", and so on are extracted from a content "SGML 文書変換言語の開発とその適用事例" corresponding to the element (context ID C1) of the title in the structured full-text data shown in FIG. 5.

Similarly, all single characters and all strings consisting of two adjacent characters are extracted from contents in other logical structures.

Then, in Step 1102, the characters and the strings extracted in Step 1101 are registered as the tree-structured data, and the document ID of the document of interest, the context IDs to which the strings belong and the character positions at which the characters and strings occur (the position at which the first character occurs for each string consisting of two adjacent characters) are stored as the index data.

That is, since "S" in the structured full-text data shown in FIG. 5 occurs as the first character of C1 (TITLE), the context ID C1 and the character position "1" are stored together with the document ID D1 into the first entry of the index (IDX1) that corresponds to "S" in FIG. 6.

Similarly, the string "SG" is stored to the first entry of the index (IDX8) corresponding to "SG" together with the document ID D1, the context ID C1 and the character position "1".

The above registration processing is repeated similarly.

This index is also described in detail in the related application.

Return to FIG. 10. In Step 1004, the registration control program 110 activates the element length index preparing program 140 to prepare an element length index table shown in FIG. 9, and stores each prepared index in the storing area 210. This index is shared by all the documents. A new index is stored in the storing area while added to the existing ones.

The element length index of FIG. 9 is used to obtain any document, element ID and element length containing a character entered.

Figure 12:
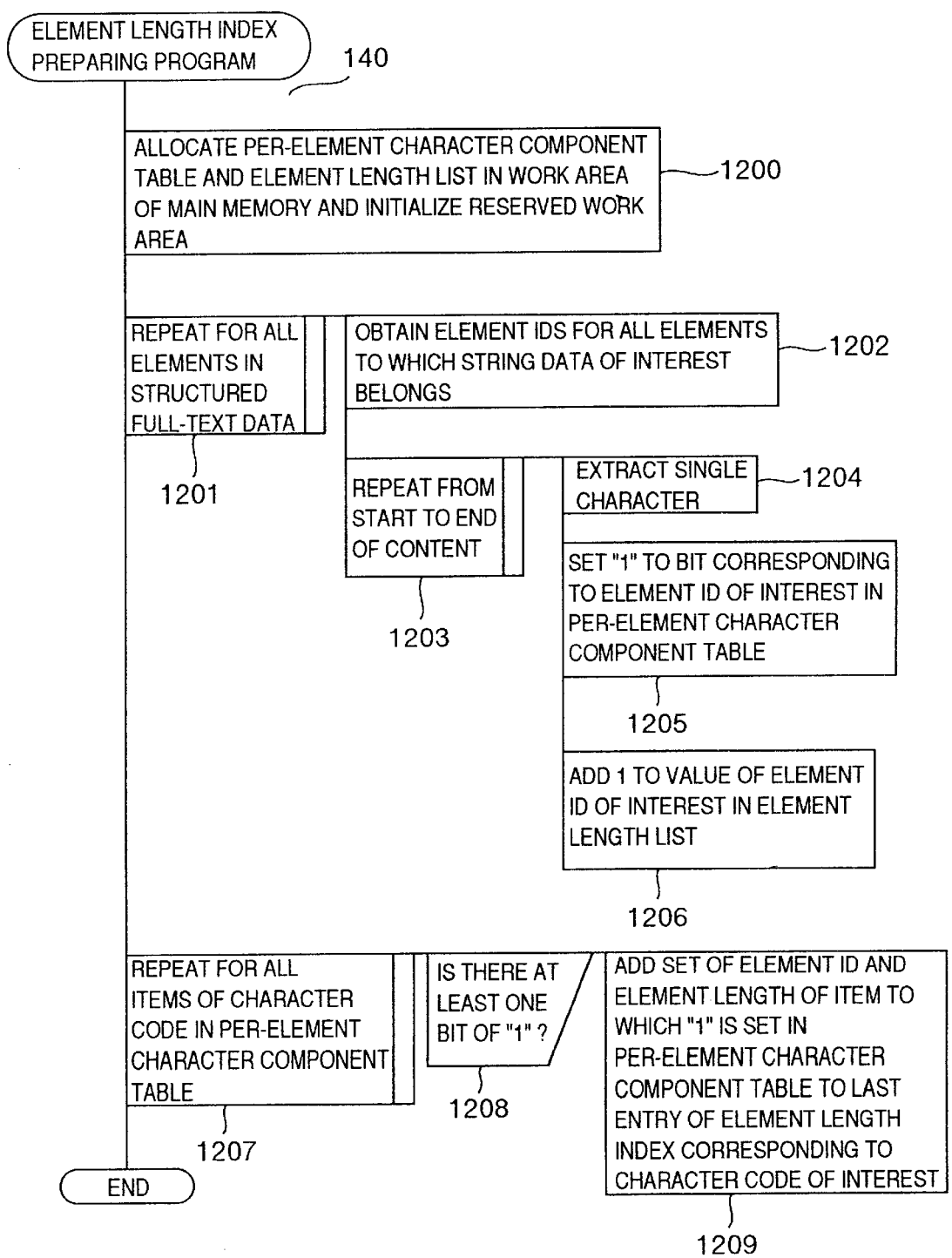
FIG. 12 is a diagram showing a flow of processing performed by an element length index preparing program.

The processing performed by the element length index preparing program 140 is shown in FIG. 12.

In Step 1201, an area for storing a per-element character component table and an element length list shown in FIG. 8 is allocated in the work area 180 and is initialized. The per-element character component table is a bit map indicating whether a character is contained in the logical structures of a registered document. The letters differs from one language to another used for describing a document. There are 20,000 or more letters in Japanese. Therefore, in a language having many letters the number of the row items of the character component table is reduced to 4,000 or so by processing the letters using a hash function, or by grouping a plurality of less frequently used letters. This character component table is described in U.S. Pat. No. 5,745,745.

The element length list (FIG. 8) indicates the correspondence between each logical structure of a registered document and its element length.

Step 1202 and subsequent processing will be described taking the structured full-text data of FIG. 5 as an example.

In the repetitive processing in Step 1202, attention is paid to the content (context ID C1) in the first row of the structured full-text data of FIG. 5.

Then, in Step 1203, the context ID C1 is extracted by searching the element ID management table shown in FIG. 4 from the top, so that E1 and E2 that is a higher rank element ID of E1 are obtained as the element IDs corresponding to the context ID C1.

In Step 1203, attention is also paid to the "SGML 文文文書", and in Step 1204, the first character "S" is extracted.

Then, in Step 1205, "1" is set to those bits corresponding to the element IDs E1 and E2 which bits are the entries of the character code "S" in the per-element character component table shown in FIG. 8.

Then, in Step 1206, 1 is respectively added to the values of E1 and E2 in the element length list, so that "1" is set to the values of E1 and E2.

Next, in Step 1203, "G" is extracted as the next character, and in Step 1205, "1" is set to the bits corresponding to the element IDs E1 and E2 which bits are the entries of the character code "G" in the per-element character component table shown in FIG. 8.

Then, in Step 1206, 1 is respectively added to the values of E1 and E2 in the element length list, so that the values of E1 and E2 are incremented to 2.

Similar processing is repeated for "M", "L", "文", "の開発とそ" and so on.

Upon completion of the processing for the content "SGML 文文書文書変換言語" corresponding to the context ID C1, Step 1202 and subsequent processing is thereafter repeated by paying attention to the next content "神奈川一郎".

By repeating the above processing for the entire structured full-text data shown in FIG. 5, the per-element character component table and the element length list shown in FIG. 8 are generated.

Next, in the repetitive processing in Step 1207, attention is paid to the entries corresponding to each character code in the per-element character component table (FIG. 8).

That is, first of all, by paying attention to the entries corresponding to "a" of the per-element character component table of FIG. 8, it is determined in Step 1208 whether there exists any bit to which "1" is set.

Since there exists no such bit for "a", attention is paid to the entries corresponding to the next character code without executing Step 1209.

If bits to which "1" is set are found, e.g., as in the character code "G," then the E1, E2, E8, E9, E11 and E12 are extracted as the element IDS to which "1" is set in Step 1209.

Then, by referring to the element length list for these element IDs, their element lengths are obtained.

The element length index shown in FIG. 9 is generated by storing the thus obtained sets each consisting of an element ID and an element length (E1 and 9,886, E2 and 20, E8 and 8,224 and so on) together with the document ID (D1) for each character code. If the per-element character component table of FIG. 8 is prepared by grouping a plurality of characters into a single item, the element length index of FIG. 9 is also prepared for each of such items. Although having different lengths, these indexes are stored in the area 210 in such a manner as to be accessed as quickly as possible when requested to be read.

The element length index is added to the storing area 210 every time a document is registered. On the other hand, the per-element character component table and the element length list are initialized every time a document is registered and deleted when the registration processing is completed.

When the above steps have been performed, the document registration processing is completed.

While the technique in which the occurrence frequency extracting index 200 and the element length index 210 in the magnetic disk 70 are updated every time a document is registered has been described in this embodiment, the following technique may also be adopted. That is, after occurrence frequency extracting index information and element length index information for all documents to be registered are prepared in the work area 180 of, the main memory 60, these information are used to update the occurrence frequency extracting index 200 and the element length index 210 of the magnetic disk 70 collectively.

(3) Search of Document

Figure 13:
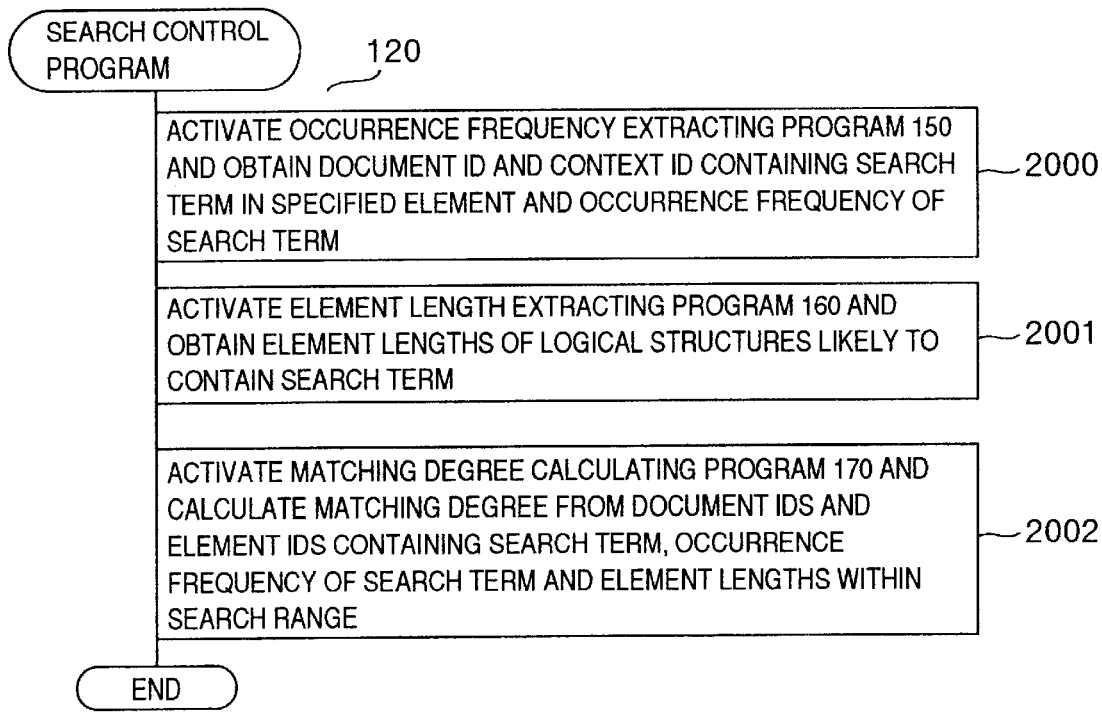
FIG. 13 is a diagram showing processing performed by a search control program.

The document search processing will be described with reference to FIG. 13.

The user enters a search command from an input unit of a structured document search system or via a network to the system. The user enters search conditions together with the search command. The user specifies as the search conditions a search term (one word, or a combination of words with AND/OR operators), a search range (document name, element name, a combination of them with AND/OR operators, and the like) and the like. A menu displaying these conditions may be supplied for the user and the user may specify the conditions by selecting them.

When the user has entered the search command, the system control program 100 activates the search control program 120 to start document search processing.

First of all, the search control program 120 activates the occurrence frequency extracting program 150 in Step 2000.

The occurrence frequency extracting program 150 extracts any document ID and context ID containing the search term and the occurrence frequency of the search term within the search range.

Figure 14:
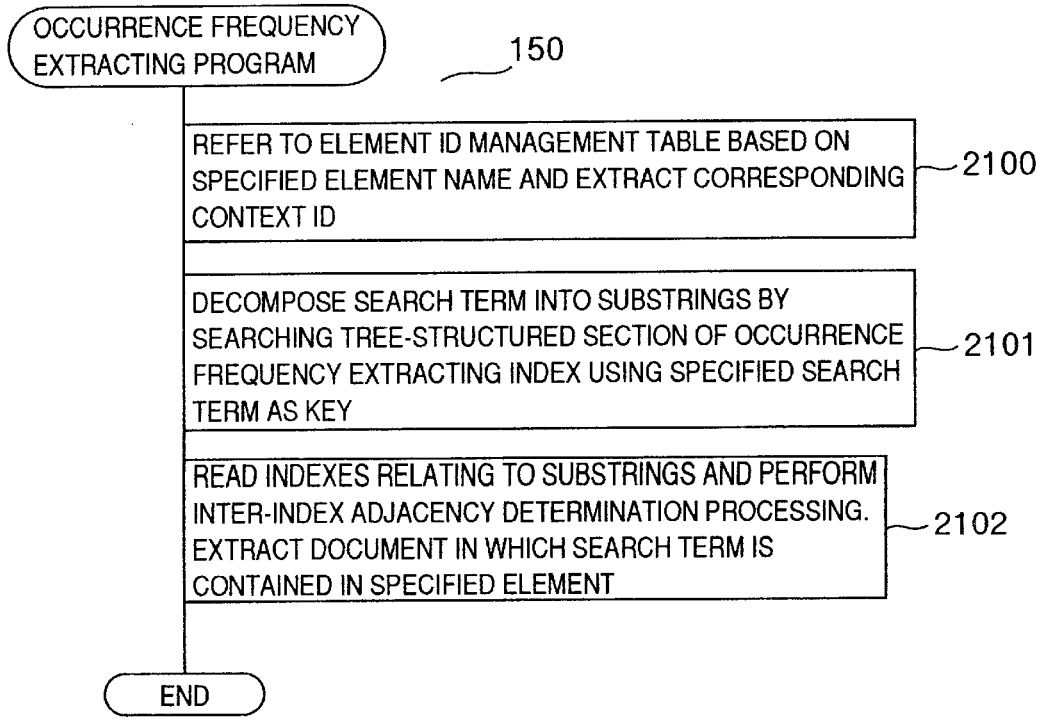
FIG. 14 is a diagram showing a flow of processing performed by an occurrence frequency extracting program.

The processing performed by the occurrence frequency extracting program 150 will be described with reference to FIG. 14.

In Step 2100, the whole or part of the occurrence frequency extracting indexes stored in the occurrence frequency extracting index storing area 200 of the magnetic disk 70 prepared at the time of registration is read to the work area 180 in the main memory 60. The element ID management table for documents within the search range is read to the work area 180 from the area 230 in the magnetic disk 70.

By referring to the element ID management table shown in FIG. 4, the context ID corresponding to the logical structure specified by the search conditions is extracted.

The following describes an example in which the user has specified the condition that any document containing the search term "SGML" in its title be searched from all the documents in the document database having such logical structures as shown in FIG. 4. By referring to the element ID management table, the element ID E2 is extracted for the logical structure that is "TITLE" specified as the object to be searched. Then, the context ID corresponding to such element ID is extracted.

Since the element E2 is the lowest rank logical structure in this example, C1 is extracted as the context ID corresponding to E2. If E2 contains subelements at the lower ranks, a plurality of context IDs corresponding to such subelements are extracted.

Then, the search term is decomposed into substrings by searching the tree-structured data section of the occurrence frequency extracting index shown in FIG. 6 using the string of the search term specified in Step 2101 as a key.

By searching the tree-structured data section of the occurrence frequency extracting index shown in FIG. 6 based on the search term in which characters are so arranged as "SGML", "SG" and "ML" are extracted as substrings constituting the search term.

Then, in Step 2102, the occurrence frequency extracting index 200 is referred to and the index data relating to the substrings extracted in Step 2101 are read to perform inter-index adjacency determination processing. By means of such processing, the document IDs and context IDs in which the specified search term is contained in the specified logical structure and the occurrence frequency of the search term are extracted.

In the above example, the indexes (IDX8 and IDX10) corresponding to the substrings "SG" and "ML" are extracted from the index storing section.

Figure 7:
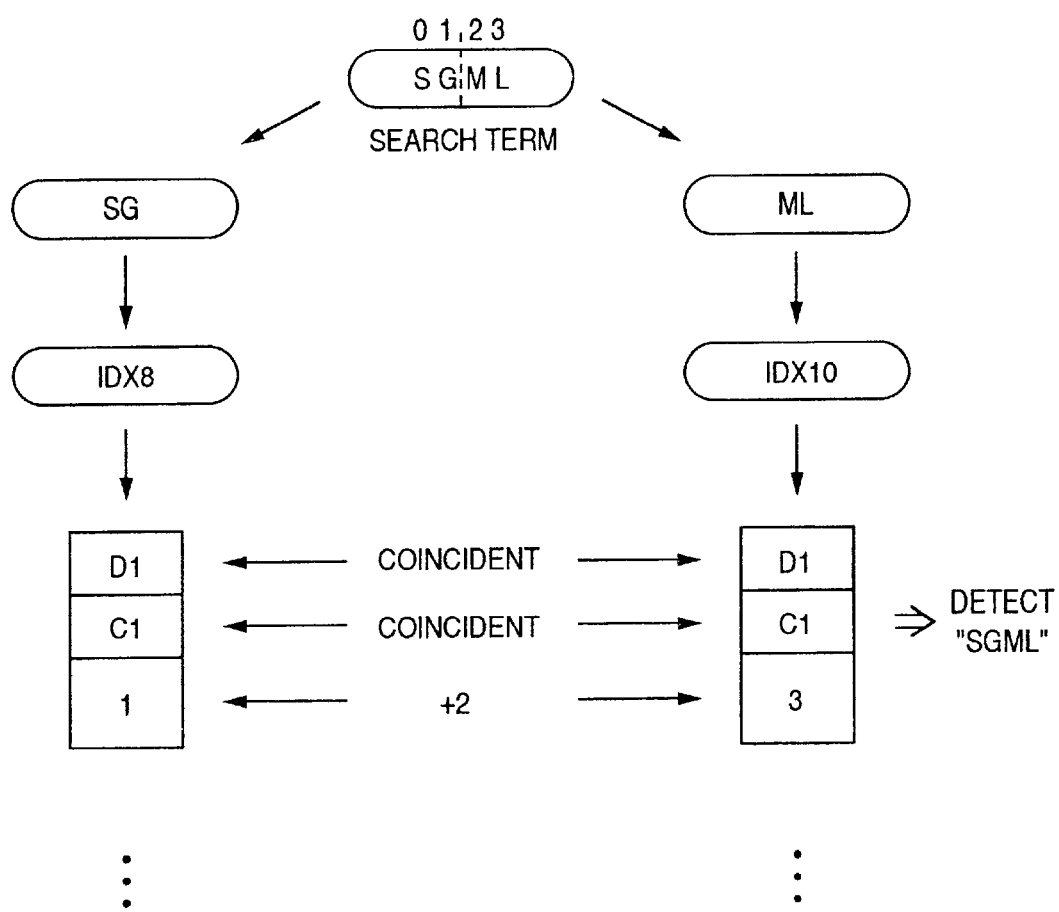
FIG. 7 is a diagram showing inter-index adjacency determination processing.

By extracting only those relating to the context ID C1 corresponding to the element to be searched from these indexes, and those for "SG" and "ML" which have the same document ID and the same context ID and having character positions adjacent to each other with two characters apart from each other (see FIG. 7) are extracted.

In this example, documents having the document ID D1, the context ID C1 and the occurrence frequency "1" are extracted as satisfying the search conditions, and the results of the search are stored in the work area 180.

Such a method of detecting the occurrence of the search term is described in the related application.

Let us return to FIG. 13. The search control program activates the element length extracting program 160 in Step 2001.

The element length extracting program 160 obtains the element length of the logical structure that is within the search range and is likely to contain the search term by using characters contained in the search term.

Figure 15:
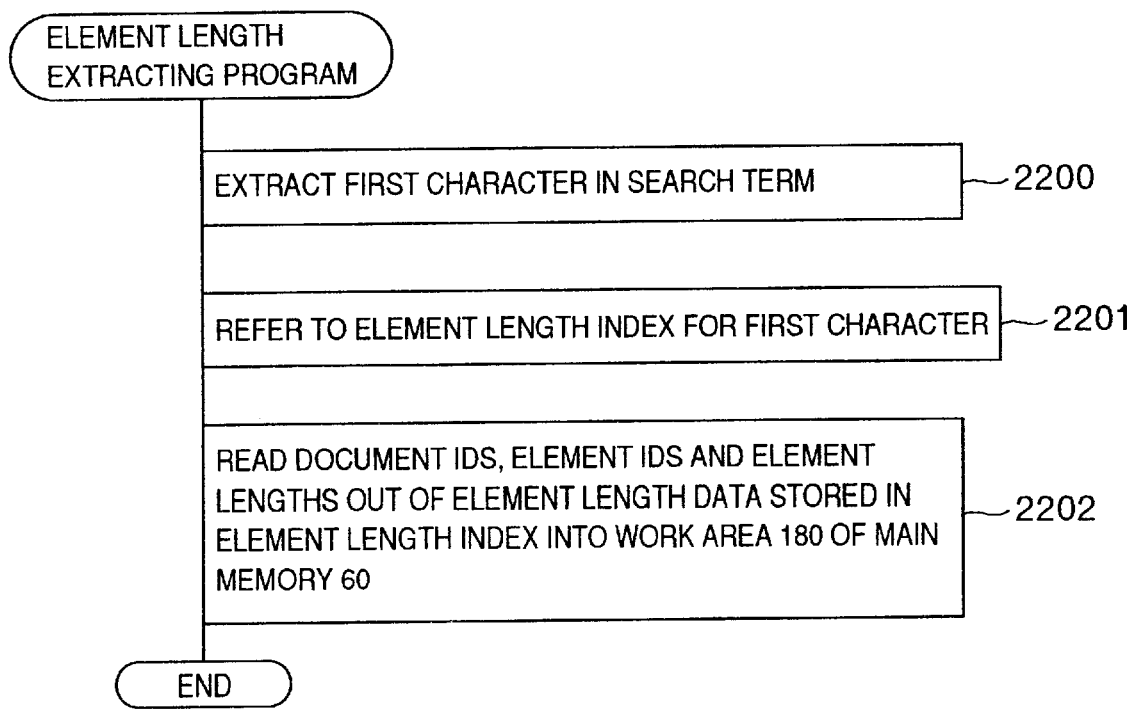
FIG. 15 is a diagram showing a flow of processing performed by an element length extracting program.

The processing performed by the element length extracting program 160 will be described with reference to FIG. 15.

First of all, in Step 2200, the very first character of the search term or a character having a distinctive feature within the search term is extracted.

In Step 2201, an index portion relating to the extracted character is read to the work area 180 from the element length index storing area 210 of the magnetic disk 70.

By extracting information relating to the extracted character from the copy of the whole or part of the read element length indexes, any document ID, element ID and element length containing the character within the search term are extracted and written to the work area 180 of the main memory 60.

In the above example, the element length index (FIG. 9) is referred to by paying attention to the first character "S" of the search term "SGML", and the document ID, the element ID and the element length of any logical structure containing "S" are obtained.

In the last step 2202, only the information relating to the logical structure specified as that to be searched out of the document IDs, the element IDs and the element lengths which have been read in Step 2201 are copied in a different part of the work area 180 of the main memory 60.

In this example, the data corresponding to E2, which is the element ID of the object to be searched out of the element length data relating to the "S" stored in the work area 180 are extracted.

Let us return to FIG. 13 again. To complete the processing, the search control program 120 activates the matching degree calculating program 170 in Step 2002.

At this time, the work area 180 has data such as the document IDs and context IDs containing the search term and the occurrence frequency of the search term, and the document IDs and element IDs containing a single character within the search term and the search range and their element lengths. The matching degree calculating program 170 calculates the matching degree to the search conditions by using these data. The matching degree may be calculated using Equation 1. It should be noted, however, that in using Equation 1, calculations may be made by substituting a document with a logical structure within the document.

In this example, "SGML" is contained once in D1–C1, and the element length of D1–E2 is 20. Therefore, the matching degree is given as $$\log_2(1+1)/\log_2(20) = 1/4.321$$

When receiving the matching degree to the search conditions for each logical structure by the above processing, the search control program 120 sends the received matching degree to the searcher through the system control program 100 after adding such matching degree to the list of the searched documents, and then completes the search processing.

(4) Modification

In Step 1206 (FIG. 12) in which the value of the element length is added by the element length index preparing program 140 that performs the document search processing shown in this embodiment, the technique in which the number of characters is counted as the element length by always adding "1" to a single character extracted from a content has been described.

However, in this counting processing, the element length may be counted by adding the byte length of a character extracted from a content (e.g., "1" for a one-byte character and "2" for a two-byte character).

The technique in which all characters are extracted from a document to be registered at the time the element length index is prepared and the first character of a search term is extracted at the time the search processing is performed has been described in this embodiment. However, the element length index may be referred to by using any character constituting the search term.

Further, the capacity of the element length index data corresponding to a character is stored in a table at the time of registration, and the table is referred to for a character contained in a search term and data relating to a character whose element length index capacity is small is read at the time of search, so that the time required for reading an element length index and the time required for processing the data within the index can be reduced.

Still further, the technique in which a character is extracted from a document to be registered and the extracted character is registered into the element length index and in which a character is extracted from a search term and the element length index is referred to for the extracted character at the time of search has been described in this embodiment.

However, a technique in which a string consisting of two or more characters of a document to be registered is registered into the element length index by similar processing and the longest substring is extracted from a search term at the time of search may also be adopted.

Still further, described in this embodiment is the technique in which document IDs for a character extracted from documents to be registered and the element ID and element length of any logical structure containing such character are stored, and in which the element lengths are extracted including the element IDs and element lengths of the logical structures not specified as the object to be searched at the time of search and only the element lengths relating to the logical structures in which the search term is present are used for calculating the matching degree in the matching degree calculating step.

However, a technique in which the element lengths of logical structures are stored in different areas per logical structure when element length indexes are prepared, and element length indexes relating to a logical structure specified to be searched are referred to for a substring extracted from the search term at the time of search may also be adopted.

The technique in which an index is prepared for a character or a string consisting of two adjacent characters in a registered document has been described as the technique for preparing an index for extracting the occurrence frequency of a search term. However, the index may be prepared only for any string consisting of two adjacent characters. The index may also be prepared for at least one of any substring consisting of at least one character (including two characters, three characters and so on), any word extracted on the basis of statistical information such as occurrence frequency in a document, a form element analysis or a dictionary, and the like. Still further, a technique based on a string pattern matching algorithm using automaton may also be adopted. In this technique, structured full-text data are stored instead of the occurrence frequency extracting index, and strings of the full-text data are collated every time a search term is entered so that information about the occurrence frequency and occurrence position are obtained.

(5) Effects

As described in the foregoing, the present invention implements a high-speed search of logical structures coinciding with the search conditions at the time of structure-specified search, and thus contributes to a high-speed calculation of the matching degree that is obtained by normalizing the occurrence frequency of a search term within a logical structure specified as an object to be searched with the element length of such logical structure.

In the examples of structure-specified search according to the present invention, the capacity for reading the element length index at the time an element length is obtained is about 80 kB (assuming that each of the element ID and the element length is treated as 4-byte data, and that there are 10 logical structures containing a search term within a document on the average when the search processing is performed to a database having 100,000 documents with the probability of occurrence of the first character of the search term being 1%), and thus search response is rarely impaired even when a large-scale document database is searched.

What is claimed is:

1. A registration and search method for structured documents each structured document consisting of hierarchical elements, comprising:

preparing correspondence data between a fixed-length-string and a string occurrence position within a structured document for all fixed-length-strings in the document and for each structured document, and additionally storing the correspondence data in an occurrence frequency extracting index;

preparing a list of a character, all hierarchical elements containing the character and element lengths, each element length presenting a text length of the hierarchical element, and additionally storing the list in an element length index;

obtaining an occurrence frequency and an occurrence position of search term by decomposing the search term into a plurality of fixed-length-substrings and by using the plurality of fixed-length-substrings and the occurrence frequency extracting index;

selecting a search character from the search term, obtaining a hierarchical element containing the search character using the character from the element length index, and extracting a length of the element corresponding to a search range using the obtained occurrence position, the element length presenting a text length of the hierarchical element; and calculating a matching degree for the search term from the obtained occurrence frequency of the search term and the extracted element length of the element corresponding to the search range.

2. A method for structured documents according to claim 1, wherein the occurrence frequency extracting index includes a tree-structured data section and an index storing section, the tree-structured data section indicating correspondence between a string and an identifier of the string, the index storing section being a list of an identifier of a document in which the string occurs, an identifier of a context in which the string occurs, and a character position for an identifier of the string.

3. A method for structured documents according to claim 1, wherein the element length index comprises a list of a character, an identifier of a document containing the character, an identifier of an element containing the character, and a length of the element.

4. A method for structured documents according to claim 1, wherein the element length index comprises a list of a group of characters, an identifier of a document containing at least one character of the set of characters, an identifier of an element containing at least one character of the group of characters, and a length of the element.

5. A method for structured documents according to claim 1, wherein the element length is the number of characters contained in an element.

6. A method for structured documents according to claim 1, wherein the element length is the number of bytes contained in an element.

7. A method for structured documents according to claim 1, wherein the element length index is generated from a per-element character component table and an element length list prepared for each structured document, the per-element character component table indicating a relationship between an element identifier and a character occurrence within a structured document, the element length list being a list of an element identifier and a length of the element.

8. A method for structured document according to claim 1, wherein the element length index includes the lengths of all level elements including lowest-level elements, highest-level elements, and intermediate-level elements.

9. A search method for structured documents comprising the steps of:

inputting search conditions including a search term and an element for specifying a search range;

obtaining an occurrence frequency and an occurrence position of the search term by decomposing the search term into a plurality of substrings and by using the plurality of substrings and the occurrence frequency extracting index;

selecting a search character from the search term, obtaining an element containing the search character using the character from element length index, and further extracting a length of the element corresponding to the search range using the obtained occurrence position;

calculating a matching degree for the search term from the obtained occurrence frequency of the search term and the extracted element length of the element corresponding to the search range; and outputting the element containing the search term and the matching degree.

10. A method for structured documents according to claim 9, wherein a first character of the search term is selected in the character selecting step.

* * * * *